United States Patent [19]
Peller

[11] 3,831,961
[45] Aug. 27, 1974

[54] STEERABLE TANDEM AXLE SUSPENSION
[75] Inventor: Henry A. Peller, Pepper Pike, Ohio
[73] Assignee: General Motors Corporation, Detroit, Mich.
[22] Filed: Sept. 12, 1973
[21] Appl. No.: 396,571

[52] U.S. Cl............................. 280/81 A, 180/24.01
[51] Int. Cl............................................. B62d 13/02
[58] Field of Search......... 180/24.01, 24.06, 79.2 C, 180/79.5; 280/81 A, 81 R, 104.5 R, 104.5 A, 104.5 B

[56] References Cited
UNITED STATES PATENTS
| | | | |
|---|---|---|---|
| 2,954,985 | 10/1960 | Drong | 180/24.01 X |
| 3,051,506 | 8/1962 | Stump | 280/81 A |
| 3,149,858 | 9/1964 | Gilbert | 280/104.5 R X |

Primary Examiner—David Schonberg
Assistant Examiner—Terrance L. Siemens
Attorney, Agent, or Firm—Edward J. Biskup

[57] ABSTRACT

A steerable tandem axle suspension for supporting the rear end of a vehicle frame and including front and rear transversely extending axles each having rotatable wheels at the opposite ends thereof. Each of the axles is formed with a housing having an arm which projects in a direction away from the other axle and a steering cylinder is incorporated with each axle adjacent the other axle. The projecting arm of each axle is connected to the vehicle frame through a spherical connection and serves as a support therefor together with a pair of laterally spaced ride cylinders. The arrangement is such that upon actuation of the steering cylinders, each rear axle is pivoted about a vertical axis passing through the associated spherical connection to provide steering movement of the axles with the ride cylinders being positioned at angles favorable to increased side stability.

4 Claims, 6 Drawing Figures

STEERABLE TANDEM AXLE SUSPENSION

As is well known, all six-wheeled vehicles experience a certain amount of lateral slippage or tire scuffing when curves are being negotiated. This occurs because when two of the axles of a vehicle are held in rigid parallelism, the rotational axes of all the wheels cannot possibly pass through a single point or a vertical line, and therefore, when corners are being turned some of the wheels necessarily must slip sideways. In the past, this slippage has been reduced somewhat by designing the suspension so that the axles are not held rigidly parallel. This was done by having the axles connected by springs to the vehicle frame so that on curves, the centrifugal force acting on the spring-supported mass transferred the load from the inner to the outer spring. Depending upon the curvature of the springs, this caused a shortening of the inner spring and lengthening of the outer spring with the result that the axles moved out of parallelism in such a way as to improve the steering conditions and reduce the scuffing action.

This invention concerns a six-wheeled vehicle of the type described above and is particularly directed to a tandem rear axle suspension that provides positive steering movement of the axles in response to steering movement of the front wheels. Thus, rather than relying on springs lengthening and shortening as a result of centrifugal force for providing steering movement of the rear axles, the present invention incorporates steering means in the form of power-operated hydraulic cylinders which are connected to the rear axles and cause the latter to be simultaneously pivoted about longitudinally spaced vertical axes so as to minimize slippage and tire scuffing as the vehicle corners.

More specifically, the present invention contemplates a steerable tandem axle suspension for supporting the rear end of a six-wheeled vehicle frame that includes front and rear transversely extending axles each of which has rotatable wheels at the opposite ends thereof. Each of the axles is formed with an enlarged housing portion located below the longitudinal center axis of the vehicle frame. First and second spherical connections respectively join the front end of the front axle and the rear end of the rear axle to the vehicle frame, and first and second pairs of linearly deflectable ride cylinders respectively connect the rear end of the front axle and the front end of the rear axle to the vehicle frame. In addition, a pair of steering cylinders are provided that extend transversely to the vehicle frame with universal means connecting the steering cylinders to the axles and the vehicle frame so as to cause steering movement of each of the axles in opposite directions about the spherical connections upon concurrent actuation of the steering cylinders. In the steered position of the axles, the ride cylinders assume positions at angles relative to the frame that tends to increase side stability.

The objects of the present invention are to provide a six-wheeled vehicle having a tandem axle arrangement at the rear end thereof that is steerable in response to steering movement of the front wheels; to provide a simple tandem axle suspension geometry combined with a power-operated lateral stabilizer that adds steering capability to the axles; to provide a steerable tandem axle suspension in which each axle is supported by a spherical connection and ride cylinders and a transverse steering cylinder serves as a lateral stabilizing link as well as an actuator for rotating the axle into a steered position about the spherical connection; and to provide a steerable tandem axle suspension which is supported by a pair of linearly deflectable ride cylinders that are adapted to be angled outwardly of a turn when the axles are rotated to a steered position and thereby provide increased stability to the vehicle.

Other objects and advantages of the present invention will be apparent from the following detailed description when taken with the drawings in which.

Figure 1:
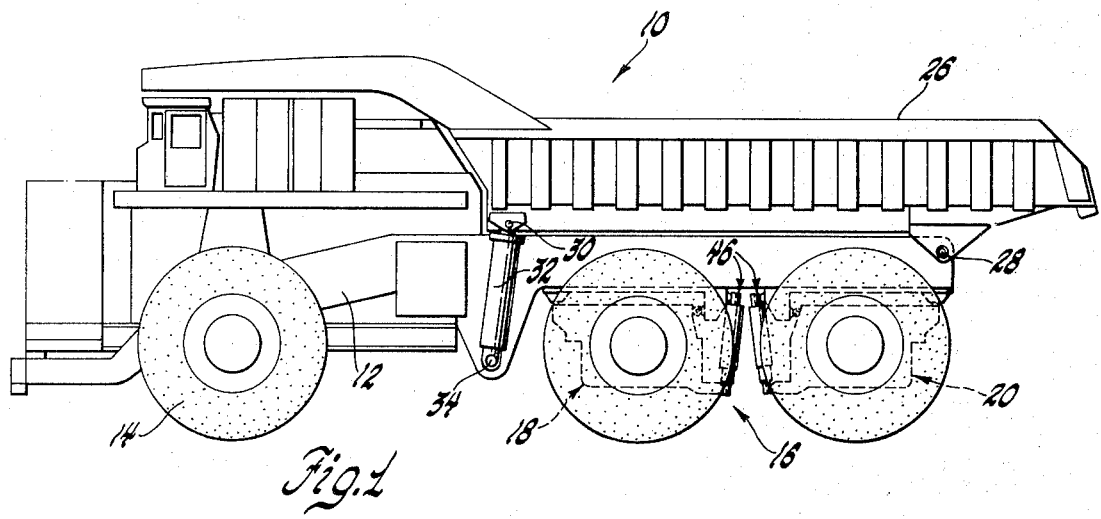
FIG. 1 is an elevational view showing a six-wheeled vehicle incorporating a steerable tandem axle suspension made according to the invention.

Referring to the drawings and more specifically FIG. 1 thereof, an off-highway six-wheeled rear dump vehicle 10 is shown comprising, in general, a vehicle frame 12 the forward end of which supports a pair of dirigible front tires 14. The frame 12 is formed as a rigid full box section with side rails interconnected by torque tube stiffeners and has the rear portion thereof supported by a steerable tandem axle suspension 16 which includes a pair of longitudinally spaced front and rear axles 18 and 20 each of which is provided with dual tires at the opposite ends thereof. The vehicle 10 is electrically powered by a diesel-generator set supported by the frame 12 above the front wheels 14 that serves to supply electricity to a pair of series wound traction motors supported within each of the axles 18 and 20. The traction motors are connected through suitable gearing not shown to final drive and wheel assemblies 22 and 24, seen in FIG. 3, which transmit driving torque to the dual tires at the opposite end of each axle.

A material-handling chute-type body 26 is carried by the frame 12 above the axles 18 and 20 and has the rear end thereof connected by axially aligned and laterally spaced pins, one of which is indicated by reference numeral 28, to the frame 12 for pivotal movement about a transverse horizontal axis. The forward portion of the body 26 outboard of each side rail of the frame 12 is connected by a pivotal connection 30 to one end of a multistage double-acting hydraulic hoist 32 the other end of which is connected by a pivotal connection 34 to the vehicle frame 12 forward of the axles 18 and 20. Thus, by expanding the hoist 32, the body 26 is moved about the pins 28 to a raised position for dumping a load.

Figure 2:
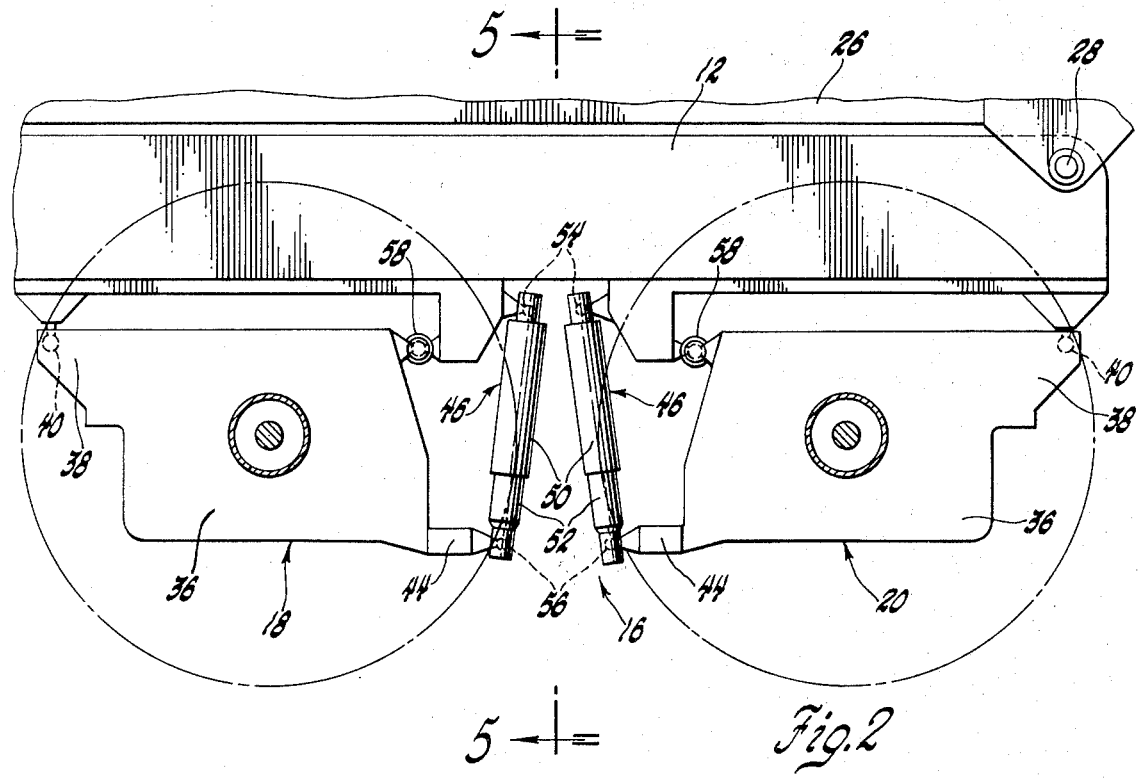
FIG. 2 is an enlarged view showing in elevation the steerable tandem axle suspension employed by the vehicle of FIG. 1.
Figure 3:
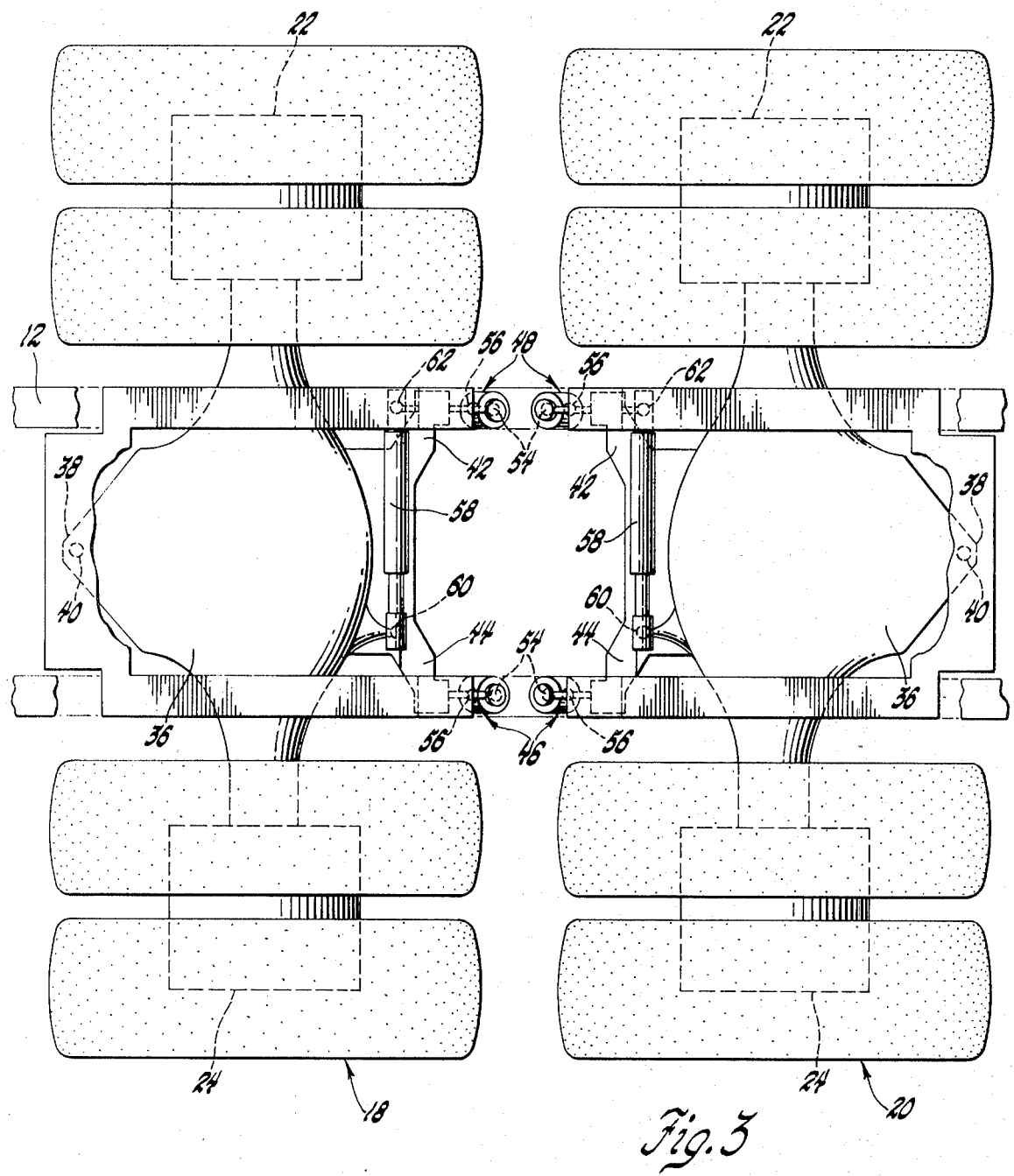
FIG. 3 is a plan view of the suspension shown in FIG. 2.

More specifically and as seen in FIGS. 2 and 3, it will be noted that both axles 18 and 20 are identical in construction and each includes a housing 36 which has an enlarged central portion for supporting the traction motors referred to above. The housing 36 has one end thereof integrally formed with an arm 38 that projects outwardly therefrom and is located midway between the tires. The arm is connected by a spherical connection 40 to a cross member which is rigid with the frame 12. The other end of each housing 36 is formed with a pair of outwardly projecting ears 42 and 44 which respectively serve as connecting points for the lower ends of a pair of ride cylinders 46 and 48.

Figure 4:
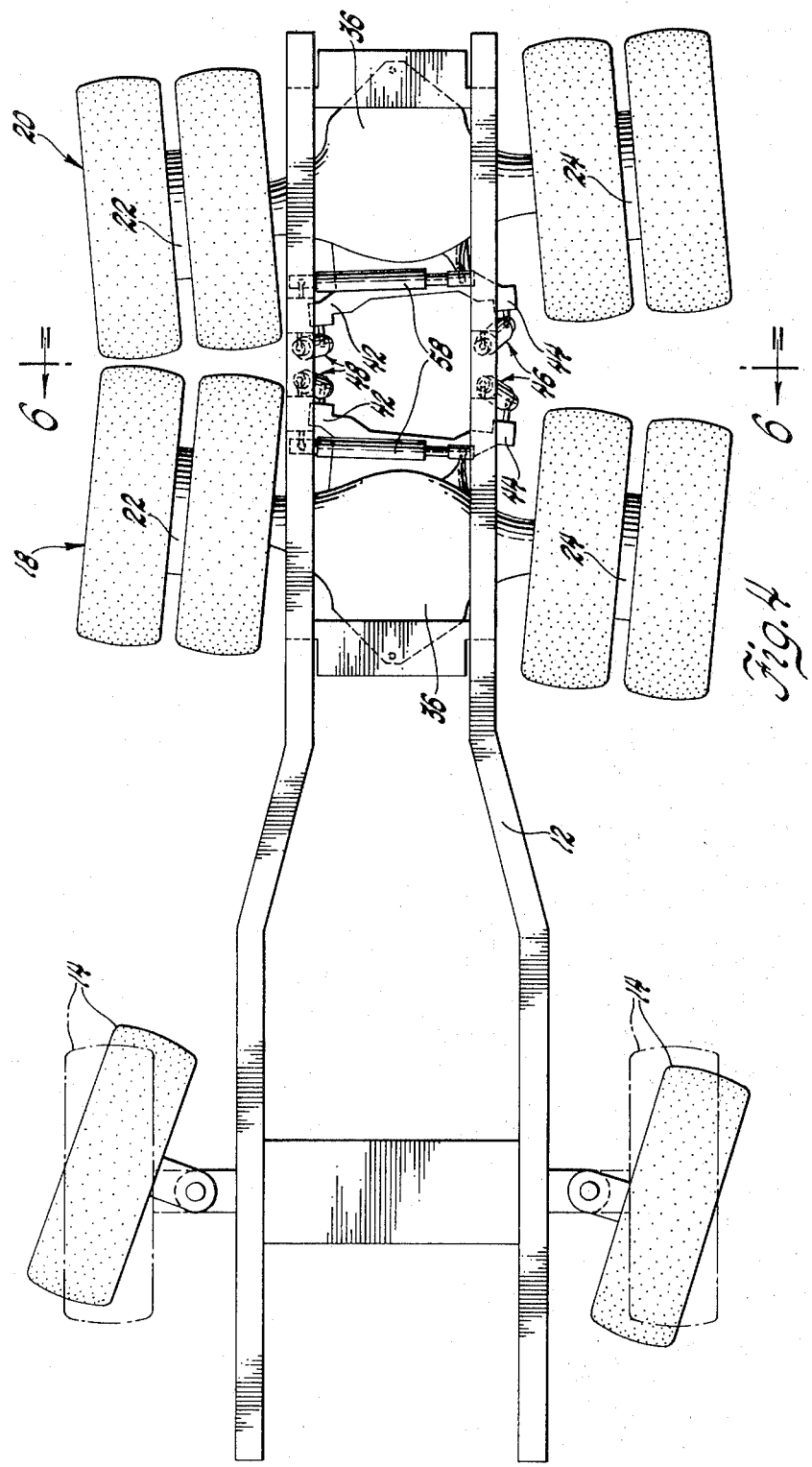
FIG. 4 is a plan view schematically showing the six-wheeled vehicle of FIG. 1 with the wheels thereof in a turned position.
Figure 5:
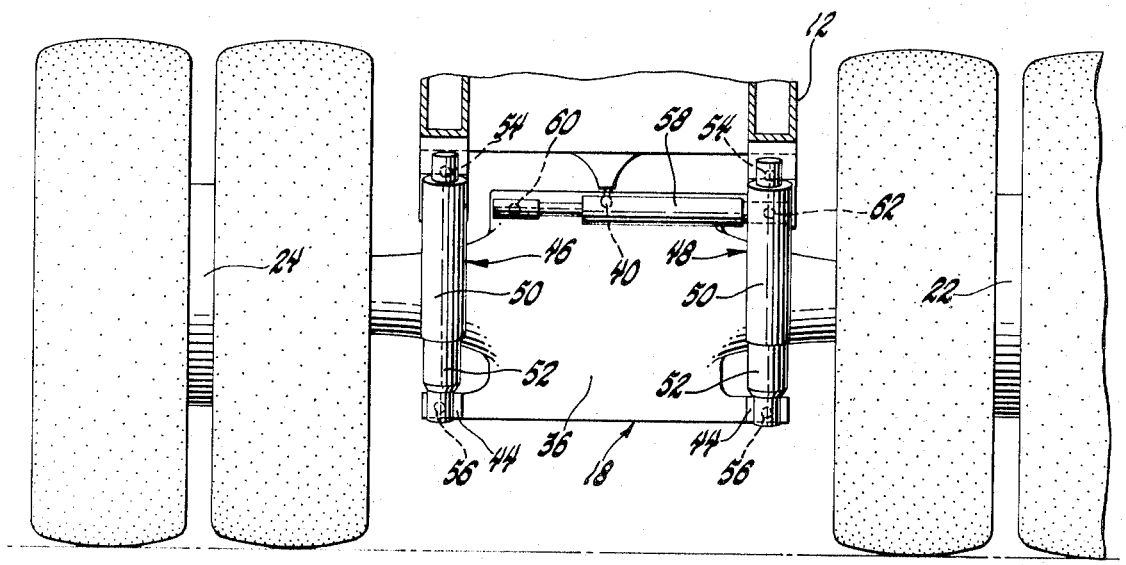
FIG. 5 is a view taken on line 5—5 of FIG. 2 showing the positions of the various suspension components when the vehicle is in a straight-ahead position.

In the preferred form and as best seen in FIG. 2, each ride cylinder 46 and 48 consists of a pair of relatively movable cylindrical housing members 50 and 52 between which a plurality of resilient rubber pad members are provided for cushioning oscillatory movement of the associated axle. The housing members 50 and 52 of each ride cylinder 46 and 48 are respectively mounted to the frame 12 and the axle through spherical pivotal connections 54 and 56 which can include pins that extend along axes that are parallel to the longitudinal axis of the vehicle. Thus, with this arrangement of suspension components, it should be apparent that each axle 18 and 20 is able to oscillate about a longitudinal axis of the vehicle that passes through the spherical connection 40 and also about a transverse axis that extends through the spherical connection. It will also be noted that in order to provide lateral stability for each axle 18 and 20, a transverse link member is provided which in this instance takes the form of a double-acting hydraulic cylinder 58 having the opposite ends thereof connected by spherical connections 60 and 62 to the axle and the frame, respectively. The hydraulic cylinder 58 will allow the associated axle to oscillate as mentioned above and also serves as a lateral stabilizer link for the axle. One further function of the cylinder 58 is to provide steering movement for the associated axle. In this regard, it will be noted that, as seen in FIG. 4, expansion of the cylinder 58 causes the associated axle to rotate to a steered position about a vertical axis passing through the spherical connection 40.

Figure 6:
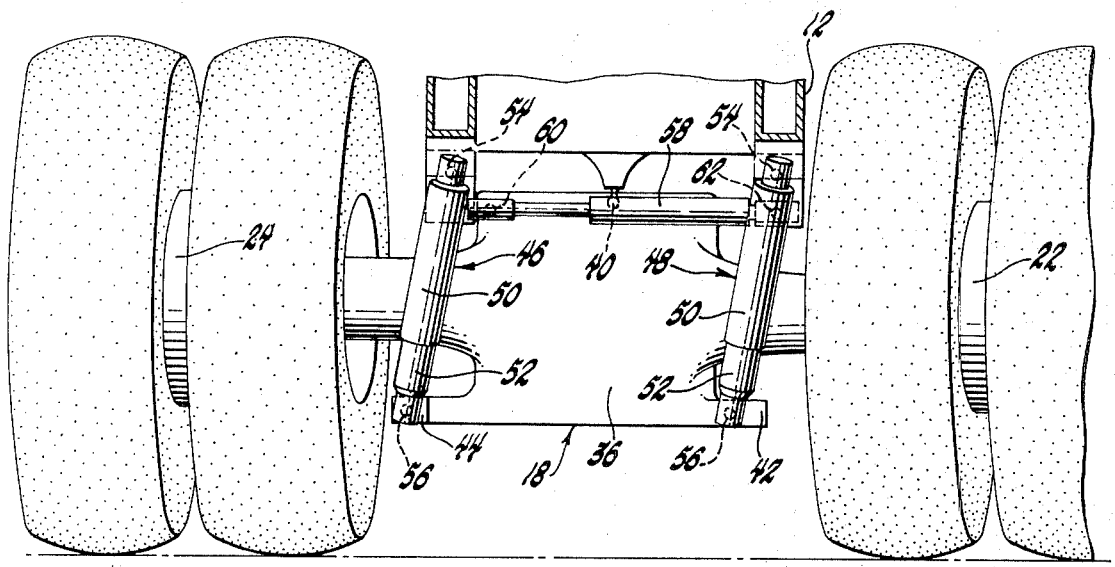
FIG. 6 is a view taken on lines 6—6 of FIG. 4 showing the position of the various suspension components when the vehicle is in a turned position.

Although not shown, the above described vehicle incorporates a steering control system which upon a predetermined steering movement of the front tires 14 will serve to direct pressurized fluid to the appropriate ends of the hydraulic steering cylinders 58 to cause simultaneous steering movement of the rear axles 18 and 20. The steering control system includes an appropriate actuator, either electric or mechanical, which upon rotation of the front tires 14 approximately 10° will serve to energize a control valve for directing pressurized fluid to the appropriate ends of the steering cylinders 58. For example and as seen in FIG. 4, when the front tires 14 are rotated in a clockwise direction from a phantom-line straight-ahead position to the full-line position, the head end of the hydraulic cylinders 58 will receive pressurized fluid and expand so as to cause the axles 18 and 20 to be rotated clockwise and counterclockwise respectively about their spherical connections 40. In each instance, the ears 42 and 44 associated with each axle move inboard and outboard respectively of the adjacent frame side rail and cause the ride cylinders 46 and 48 to assume the inclination shown in FIG. 6. In other words, the ride cylinders are angled outwardly of the turn and accordingly improve the side loading capability of the suspension. This occurs because the ride cylinders have a horizontal force component pointing towards the center of the turn circle that tends to offset the outwardly directed centrifugal forces acting on the vehicle frame. Moreover, the axles 18 and 20 will be positively steered so as to facilitate the turning movement of the vehicle and thereby prevent scuffing and unnecessary wear of the rear tires. It will be understood that steering movement of the front wheels 14 in a counterclockwise direction from the straight-ahead position as seen in FIG. 4, will result in the hydraulic cylinders 58 being contracted and will cause the axle 18 to be rotated counterclockwise about its spherical connection 40 while axle 20 will be rotated clockwise about its spherical connection.

It is intended that the degree of steerability provided for each axle 18 and 20 of the vehicle 10 be between 7 and 10 degrees. It should be apparent, however, that the amount of steerability allowed for each axle will be determined by the distance between the axes of wheel rotation of both axles 18 and 20 and the size of the various parts thereof and can be increased or decreased depending on design requirements.

Various changes and modifications can be made in this construction without departing from the spirit of the invention. Such changes and modifications are contemplated by the inventor and he does not wish to be limited except by the scope of the appended claims.

I claim:

1. A steerable tandem axle suspension for supporting the rear end of a vehicle frame and including front and rear transversely extending axles each of which has rotatable wheels at the opposite ends thereof, each of said axles being formed with a housing located below the longitudinal center of the vehicle frame and having a front end and a rear end, first and second spherical connections respectively joining the front end of the front axle and the rear end of the rear axle to the vehicle frame along the longitudinal center axis of the latter, first and second pairs of ride cylinders respectively pivotally connecting the rear end of the front axle and the front end of the rear axle to the vehicle frame, first and second steering actuators extending transversely to the vehicle frame and being located between said axles, and means universally connecting said first and second steering actuators to said front and rear axles respectively and to said vehicle frame so as to permit said axles to oscillate relative to the vehicle frame and to cause steering movement of each of said axles in opposite directions about the spherical connections upon concurrent operation of the steering actuators.

2. A steerable tandem axle suspension for supporting the rear end of a vehicle frame and including front and rear transversely extending axles each of which has rotatable wheels at the opposite ends thereof, each of said axles being formed with an enlarged housing portion located below the longitudinal center of the vehicle frame and having a front end and a rear end, first and second spherical connections respectively joining the front end of the front axle and the rear end of the rear axle to the vehicle frame along the longitudinal center axis of the latter, first and second pairs of ride cylinders respectively connecting the rear end of the front axle and the front end of the rear axle to the vehicle frame, each of said pairs of ride cylinders being laterally spaced on opposite sides of said longitudinal center axis of the frame and having upper and lower ends pivotally connected to the vehicle frame and the associated axle respectively, first and second steering cylinders extending transversely to the vehicle frame and being located between said axles, and means universally connecting said first and second steering cylinders to said front and rear axles respectively and to said vehicle frame so as to permit said axles to oscillate relative to the vehicle frame and to cause steering movement of each of said axles in opposite directions about the spherical connections upon concurrent expansion of the steering cylinders.

3. The tandem axle suspension of claim 2 wherein the lower ends of the ride cylinders along each side of the vehicle frame are angled outwardly of the turn when the front and rear axles are moved in opposite directions about the spherical connections.

4. In combination with a vehicle having a frame provided with dirigible wheels at the front end thereof and a steerable tandem axle suspension at the rear end of the frame, said steerable tandem axle suspension comprising front and rear transversely extending rear axles each of which has rotatable wheels at the opposite ends thereof, each of said rear axles being formed with an enlarged housing portion located below the longitudinal center of the vehicle frame and having a front end and a rear end, first and second spherical connections respectively joining the front end of the front axle and the rear end of the rear axle to the vehicle frame, first and second pairs of ride cylinders respectively connecting the rear end of the front axle and the front end of the rear axle to the vehicle frame, first and second double-acting hydraulic steering cylinders extending transversely to the vehicle frame and being located between said axles, and means universally connecting said first and second steering cylinders to said front and rear axles respectively and to said vehicle frame so as to permit said axles to oscillate relative to the vehicle frame and to cause steering movement of each of said axles in opposite directions about the spherical connections upon concurrent expansion of the steering cylinders.

* * * * *